UNITED STATES PATENT OFFICE.

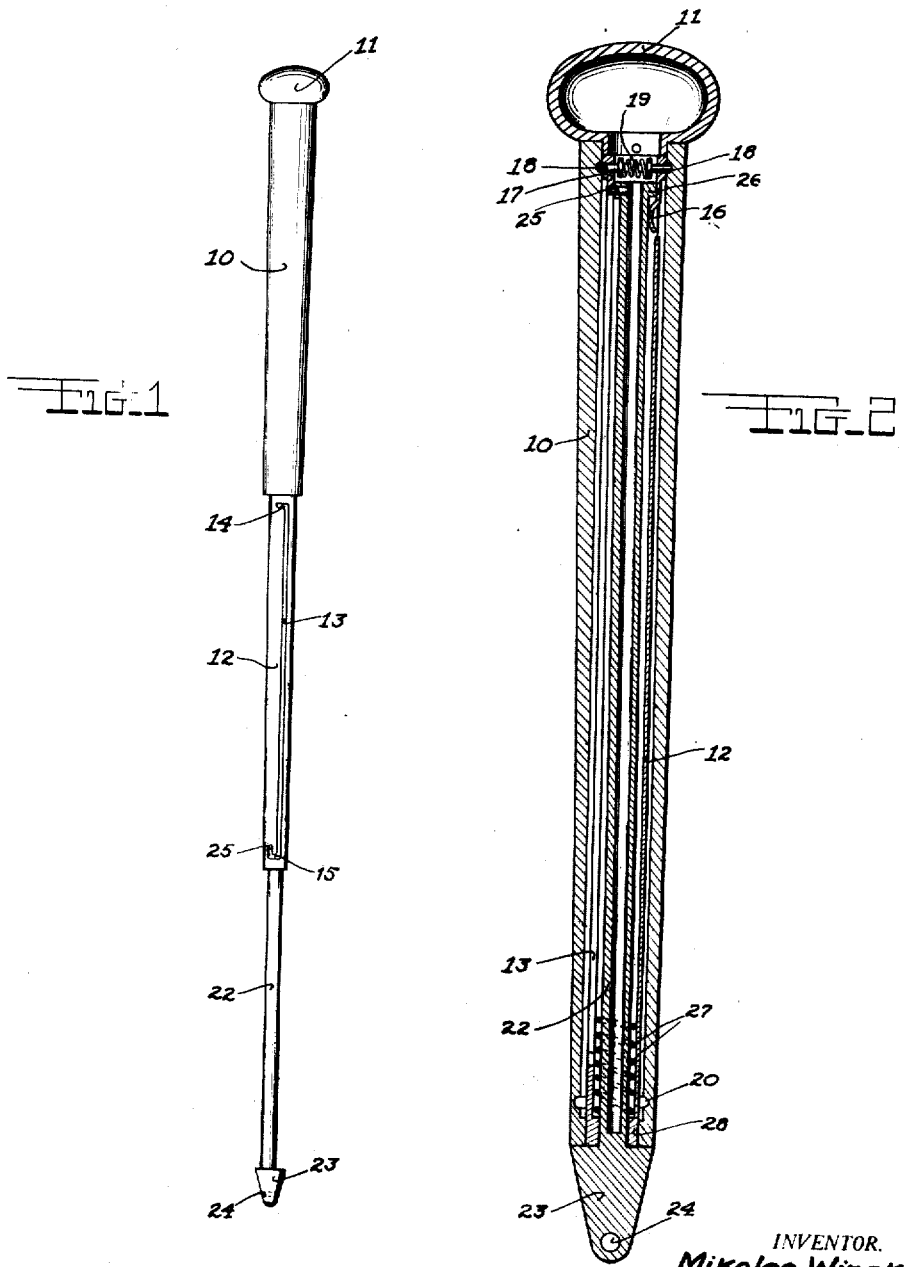

MIKOLAS WINSKAS, OF EASTHAMPTON, MASSACHUSETTS.

FISHING-ROD.

1,337,378.  Specification of Letters Patent.  Patented Apr. 20, 1920.

Application filed October 11, 1919. Serial No. 330,030.

*To all whom it may concern:*

Be it known that I, MIKOLAS WINSKAS, a citizen of Russia, residing at Easthampton, county of Hampshire, and State of Massachusetts, have invented certain new and useful Improvements in Fishing-Rods, of which the following is a specification.

The principal object of this invention is to provide a fishing rod having telescopic sections.

Another object is in the provision for controlling and locking the sliding members in extended and contracted positions, affording a light, practical and convenient fishing rod of great rigidity and inexpensive construction.

These objects are attained by the novel construction and combination of parts hereinafter described and shown in the accompanying drawings, forming a material part of this disclosure, and in which—

Figure 1 is a vertical elevational view of the rod in open position, and,

Fig. 2 is an enlarged vertical sectional view of the same in telescopic position.

Referring to the drawings in detail, the numeral 10 designates a hollow conical casing surmounted by a fixed handle 11. An intermediate tube 12, slidable within the casing 10, is pierced through its side by an elongated slot 13, turned angularly at its upper end to form a bayonet lock 14, and at its lower extremity has a hook-shaped locking element 15.

Formed integrally with the tube 12 is a depressed friction spring element 16, and secured to the upper end of tube 12 is a hollow annular head 17, carrying the movable locking pins 18, pushed outwardly by the coiled spring 19, so as to engage with a groove or recess formed around the annular interior of the casing 10, the pins being also engageable with the groove 20 at the opposite end of said casing.

An inner tube 22 has secured to its lower end a cone shaped tip 23, provided with a line or cord attaching aperture 24.

At the upper end of the tube 22 is a pin 25 secured within the head 26 and engageable with the slot 13 of the tube 12.

A coiled spring 27, surrounding the tube 22 and abutting the shoulder 28, provides a means for locking within the element 15 the tubes 12 and 22.

In operation, the fishing rod telescoped within its casing, and held therewith by means of tensional spring resistance, is withdrawn or extended by pulling outwardly the extending end and locking the same by a slight turning action in combination with an inward movement derived from the internal spring. Upon ceasing the turning effort and giving another outward pulling movement, the intermediate spring retained locking pins are released, permitting a complete withdrawal and automatically locking the parts in a fully extended position.

Having thus described my invention, what I claim as new and desire to secure by Letters Patent, is—

1. In a fishing rod, a casing, a pair of telescopic tubes slidable in said casing, a head on said casing, a tip on the bottom of the inner telescopic tube, means for securing a cord to said tip, means carried by the outer of said tubes engaging in recesses in said casing, a spring formed with the outer of said tubes impinging on the inner tube, and means coöperative between said inner and outer tubes for holding them in an adjusted position.

2. In a fishing rod, the combination with a hollow casing, and a head engaged therewith, of an upper and lower telescopic tube slidable in said casing, interior annular recesses formed in said casing at each end, a head on the outer of said tubes, detent plungers carried by said head engageable in either of said recesses, a spring detent formed with the outer of said tubes impinging on the inner tube when in closed position, a longitudinal slot having angular ends formed in the wall of the upper of said tubes, and a pin carried by the inner of said tubes engaged in said slot.

3. In a fishing rod, the combination with a hollow casing and a head engaged therewith, of an intermediate tube slidable in said casing, said intermediate tube containing an elongated slot having angular ends, an interior tube slidable in said intermediate tube, a perforate tip at the end of said interior tube, a head formed with said intermediate tube, a pair of oppositely disposed plungers operative in said head, means for normally pressing said plungers outward, means formed interiorly in said casing at each end thereof adapted to receive said plungers whereby said intermediate tube may be held in either an extended or retracted position, and means carried by said interior tube engaged in the mentioned slot whereby said tubes may be held in adjusted position.

In testimony whereof I have affixed my signature.

MIKOLAS WINSKAS.